United States Patent
Cho et al.

(10) Patent No.: US 7,365,819 B2
(45) Date of Patent: Apr. 29, 2008

(54) IN-PLANE SWITCHING MODE LIQUID CRYSTAL DISPLAY DEVICE AND METHOD OF FABRICATING THE SAME

(75) Inventors: Yong-Jin Cho, Seoul (KR); Jung-Il Lee, Seoul (KR); Min-Joo Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/609,867

(22) Filed: Jul. 1, 2003

(65) Prior Publication Data

US 2004/0109121 A1  Jun. 10, 2004

(30) Foreign Application Priority Data

Dec. 10, 2002  (KR) .................. 10-2002-0078485

(51) Int. Cl.
*G02F 1/1343* (2006.01)

(52) U.S. Cl. ........................... 349/141; 349/38

(58) Field of Classification Search ............... 349/38, 349/39, 43, 138, 139, 141, 143, 147, 187
See application file for complete search history.

(56) References Cited

U.S. PATENT DOCUMENTS

| | | |
|---|---|---|
| 5,598,285 A | 1/1997 | Kondo et al. |
| 5,745,207 A | 4/1998 | Asada et al. |
| 5,805,247 A | 9/1998 | Oh-e et al. |
| 5,831,701 A | 11/1998 | Matsuyama et al. |
| 5,838,037 A | 11/1998 | Masutani et al. |
| 5,917,564 A | 6/1999 | Kim et al. |
| 5,946,060 A | 8/1999 | Nishiki et al. |
| 5,969,782 A * | 10/1999 | Lee et al. .................. 349/141 |
| 5,990,987 A | 11/1999 | Tanaka |
| 6,028,653 A | 2/2000 | Nishida |
| 6,040,887 A | 3/2000 | Matsuyama et al. |
| 6,094,250 A | 7/2000 | Choi et al. |
| 6,097,454 A | 8/2000 | Zhang et al. |
| 6,266,118 B1 * | 7/2001 | Lee et al. .................. 349/141 |

(Continued)

FOREIGN PATENT DOCUMENTS

JP  9-5764  1/1997

(Continued)

OTHER PUBLICATIONS

S.H. Lee, et al. "High-Transmittance, Wide-Viewing-Angle Nematic Liquid Crystal Display Controlled by Fringe-Field Switching." *Asia Display*, 1998, pp. 371-374.

(Continued)

*Primary Examiner*—Thoi V. Duong
(74) *Attorney, Agent, or Firm*—McKenna Long & Aldridge LLP

(57) ABSTRACT

An in-plane switching mode liquid crystal display device includes a plurality of gate lines and data lines defining a plurality of pixel regions, a driving device disposed within each of the pixel regions, at least one first electrode having a first width and at least one second electrode having a second width both arranged within the pixel region, and at least one third electrode having a third width overlapping at least one of the first and second electrodes to form a storage capacitor.

21 Claims, 5 Drawing Sheets

U.S. PATENT DOCUMENTS

| | | |
|---|---|---|
| 6,266,166 B1 | 7/2001 | Katsumata et al. |
| 6,292,237 B1 * | 9/2001 | Hebiguchi ............... 349/39 |
| 6,784,965 B2 * | 8/2004 | Kim et al. ............... 349/141 |
| 6,850,303 B2 * | 2/2005 | Kimura et al. ........... 349/141 |
| 2001/0050745 A1 | 12/2001 | Liu et al. |

FOREIGN PATENT DOCUMENTS

| | | |
|---|---|---|
| JP | 9-73101 | 3/1997 |
| JP | 10-221705 | 8/1998 |
| JP | 2002-023185 | 1/2002 |

OTHER PUBLICATIONS

S. Matsumoto, et al. "LP-A: Display Characteristics of In-Plane-Switching (IPS) LCDs and A Wide-Viewing-Angle 14.5-in. IPS TFT-LCD." *Euro Display* 1996, pp. 445-448.

H. Wakemoto, et al. "38.1: An Advanced In-Plane-Switching Mode TFT-LCD." *Sid Digest*, 1997, pp. 929-932.

R. Kiefer, et al. "P2-30: In-Plane Switching of Nematic Liquid Crystals." *Japan Display*, 1992, pp. 547-550.

M. Ohta, et al. "S30-2: Development of Super-TFT-LCDs with In-Plane Switching Display Mode." *Asia Display*, 1995, pp. 707-710.

M, Oh-E, et al. "S23-1 : Principles and Characteristics of Electro-Optical Behaviour with In-Plane Switching Mode." *Asia Display*, 1995, pp. 577-580.

S. Endoh, et al. "Advanced 18.1-inch Diagonal Super-TFT-LCDs with Mega Wide Viewing Angle and Fast Response Speed of 20ms." *IDW*, 1999, pp. 187-190.

\* cited by examiner

IN-PLANE SWITCHING MODE LIQUID CRYSTAL DISPLAY DEVICE AND METHOD OF FABRICATING THE SAME

The present invention claims the benefit of Korean Patent Application No. 78485/2002 filed in Korea on Dec. 10, 2002, which is hereby incorporated by reference.

BACKGROUND OF THE INVENTION

1. Field of the Invention

The present invention relates to a liquid crystal display device and a method of fabricating a liquid crystal display device, and more particularly, to an in-plane switching mode liquid crystal display device and a method of fabricating an in-plane switching mode liquid crystal display device.

2. Description of the Related Art

Currently, portable electronic devices, such as mobile phones, personal digital assistants (PDAs), and notebook computers, require various types of flat panel display devices. For example, liquid crystal display (LCD) devices, plasma display panel (PDP) devices, field emission display (FED) devices, and vacuum fluorescent display (VFD) devices have all been developed for application as a flat panel display. However, the LCD devices are attractive for their simplified production technology, easy driving means, and high image production quality.

The LCD devices have various display modes according to particular arrangement of liquid crystal molecules. For example, twisted nematic (TN) mode LCD devices are commonly used because of their easy display of black-and-white images, fast response speed, and low driving voltage. During operation of a TN mode LCD device, liquid crystal molecules initially oriented to be parallel with a substrate are oriented nearly perpendicular to the substrate when a voltage is applied thereto. However, when the voltage is applied, the viewing angle is narrowed due to refractive anisotropy of the liquid crystal molecules. Accordingly, various modes of LCD devices having wide viewing angle characteristics have been developed, including in-plane switching (IPS) mode LCD devices.

FIG. 1 is a plan view of an in-plane switching mode LCD device according to the related art, FIG. 2A is a cross sectional view along I-I' of FIG. 1 according to the related art, and FIG. 2B is a cross sectional view along II-II' of FIG. 1 according to the related art. In FIG. 1, a pixel of a liquid crystal display panel 1 is defined by gate lines 3a and 3b arranged along a longitudinal direction and data lines 4a and 4b arranged along a direction traverse to the longitudinal direction. Although only the $(n,m)^{th}$ pixel of the IPS liquid crystal display panel is shown, an N-number of gate lines (wherein N>n) and an M-number of data lines (where M>m) are arranged on the liquid crystal display panel 1 to form a plurality of pixels across an entire surface of the liquid crystal display panel 1. A thin film transistor 10 is formed at a region where the gate and data lines 3a and 4a cross, and includes a gate electrode 12 to which a scan signal is supplied from the gate line 3a; a semiconductor layer 13 formed on the gate electrode 12 and is activated as the scan signal is supplied to form a channel layer, and source and drain electrodes 14 and 15.

A common electrode 5 and a pixel electrode 7 are arranged in parallel to the data lines 4a and 4b, and are both disposed within the pixel region. In addition, a common line 20 electrically connected to the common electrode 5 is arranged to be in parallel to the gate lines 3a and 3b on an upper portion of the pixel region. The pixel electrode 7 is electrically connected to a pixel electrode line 22 that includes a portion that overlaps with the gate line 3b and common line 20 of an adjacent $(n+1)^{st}$ pixel. Accordingly, a storage capacitor is formed on the IPS mode LCD device due to the overlap of the pixel electrode line 22, the gate line 3b, and the common line 20.

In the IPS mode LCD device, liquid crystal molecules are initially oriented to be parallel with the common electrode 5 and the pixel electrode 7. However, when the thin film transistor 10 is enabled and the signal is supplied to the pixel electrode 7, a horizontal electric field substantially parallel with the surface of the liquid crystal display panel 1 is generated between the common electrode 5 and the pixel electrode 7. Accordingly, the liquid crystal molecules are rotated along a same plane of the horizontal electric field, thereby preventing gray inversion due to the refractive anisotropy of the liquid crystal molecules.

In FIG. 2A, the common electrode 5 is formed on a first transparent substrate 30, and the pixel electrode 7 is formed on a gate insulating layer 32. Since the common electrode 5 and the pixel electrode 7 are connected to the common line 20 and to the pixel electrode line 22, respectively, it is desirable that the common line 20 and the pixel electrode line 22 are also formed on the first substrate 30 and on the gate insulating layer 32, as shown in FIG. 2B.

Although not shown, a gate electrode 12 of the thin film transistor is formed on the first substrate 30, and the semiconductor layer 13 is formed on the gate insulating layer 32. In addition, the source electrode 14 and the drain electrode 15 are formed on the semiconductor layer 13, and a passivation layer 34 is deposited on an entire surface of the first substrate 30.

In the liquid crystal display panel 1, when the scan signal is supplied to the thin film transistor 10 through the gate line 3a, the thin film transistor 10 is turned ON and an image signal is input to the pixel electrode 7 through the data line 4. Accordingly, the horizontal electric field in parallel to the first substrate 30 is generated between the common electrode 5 and the pixel electrode 7. Thus, the liquid crystal molecules are rotated along a direction of with the horizontal electric field.

A black matrix 42 is formed on a second substrate 40 for preventing light from leaking to the thin film transistor area and between the pixel regions. In addition, a color filter layer 44 is formed on the second substrate for generating colored images, and a liquid crystal material layer 50 is formed between the first substrate 30 and the second substrate 40.

The IPS mode LCD device requires use of a storage capacitor to improve stability of gray level images, and to reduce a flicker phenomenon and reduce generation of residual images. In order to form the storage capacitor, the LCD devices commonly include storage-on-gate (SOG) structures and storage-on-common (SOC) structures. In the SOG structures, a pixel electrode line is arranged to overlap a gate line to form a storage capacitor. In the SOC structures, a common line is formed within a pixel region and a pixel electrode line is arranged to overlap the common line to form a storage capacitor.

However, LCD devices using the SOG and SOC structures have the following problems. First, in the SOG structures, since the gate line is formed having a set width, overlap of the gate line and the pixel electrode line is limited. Accordingly, sufficient amounts of storage capacitance cannot be achieved. Second, in the SOC structures, even though overlap of the common line and the pixel electrode line can be controlled to provide sufficient amounts of storage capacitance by enlarging the widths of the common and pixel electrode lines, the aperture ratio of the LCD device is lowered due to the enlarged widths of the common and pixel electrode lines.

To resolve these problems, hybrid-type LCD devices have been developed that combine advantages of the SOG and SOC structures to ensure sufficient amounts of the storage capacitance by overlapping the pixel electrode line with the common and gate lines. The IPS mode LCD devices shown in FIGS. 1, 2A, and 2B include the hydrid-type LCD devices. For example, in FIG. 2B, the common line 20 is arranged near the gate line 3b of the adjacent $(n+1)^{st}$ pixel, and the pixel electrode line 22 overlaps with portions of the gate line 3b and the common line 20 of the $(n+1)^{st}$ pixel. However, first and second widths t1 and t2 (in FIG. 1) of the common line 20 and the pixel electrode line 22 must both be formed having larger widths to ensure sufficient amounts of storage capacitance, thereby limiting the aperture ratio.

SUMMARY OF THE INVENTION

Accordingly, the present invention is directed to an in-plane switching mode liquid crystal display device and method of fabricating an in-plane switching mode liquid crystal display device that substantially obviates one or more of the problems due to limitations and disadvantages of the related art.

An object of the present invention is to provide an in-plane switching (IPS) mode liquid crystal display (LCD) device having sufficient amounts of storage capacitance and improved aperture ratio.

Another object of the present invention is to provide a method of fabricating an in-plane switching (IPS) mode liquid crystal display (LCD) device having sufficient amounts of storage capacitance and improved aperture ratio.

Additional features and advantages of the invention will be set froth in the description which follows, and in part will be apparent from the description, or may be learned by practice of the invention. The objectives and other advantages of the invention will realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes a plurality of gate lines and data lines defining a plurality of pixel regions, a driving device disposed within each of the pixel regions, at least one first electrode having a first width and at least one second electrode having a second width both arranged within the pixel region, and at least one third electrode having a third width overlapping at least one of the first and second electrodes to form a storage capacitor.

In another aspect, an in-plane switching mode liquid crystal device includes a plurality of gate lines and data lines defining a plurality of pixel regions, a driving device disposed with each of the pixel regions, at least a pair of electrodes arranged within each of the pixel regions for generating a horizontal electric field, and at least one storage capacitor electrode having a first width overlapping at least one electrode between the pair of electrodes for forming a storage capacitor.

In another aspect, a method of fabricating an in-plane switching mode liquid crystal display device includes forming a plurality of gate lines and data lines on a first substrate to define a plurality of pixel regions, forming a driving device disposed within each of the pixel regions, forming at least one first electrode having a first width and at least one second electrode having a second width within the pixel region, and forming at least one third electrode having a third width to overlap at least one of the first and second electrodes to form a storage capacitor.

In another aspect, a method of fabricating an in-plane switching mode liquid crystal device includes forming a plurality of gate lines and data lines to define a plurality of pixel regions, forming a driving device disposed with each of the pixel regions, forming at least a pair of electrodes arranged within each of the pixel regions for generating a horizontal electric field, and forming at least one storage capacitor electrode having a first width to overlap at least one electrode between the pair of electrodes for forming a storage capacitor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
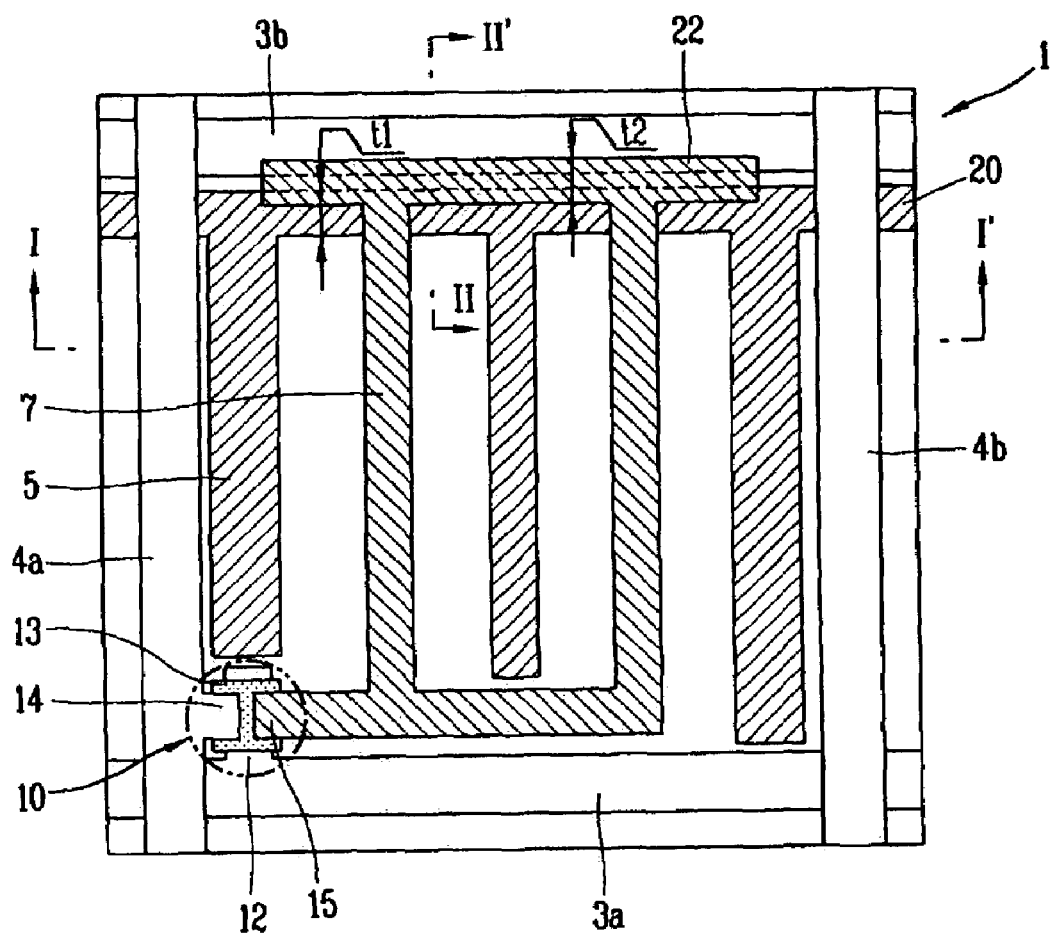
FIG. 1 is a plan view of an in-plane switching mode LCD device according to the related art.
Figure 2A:
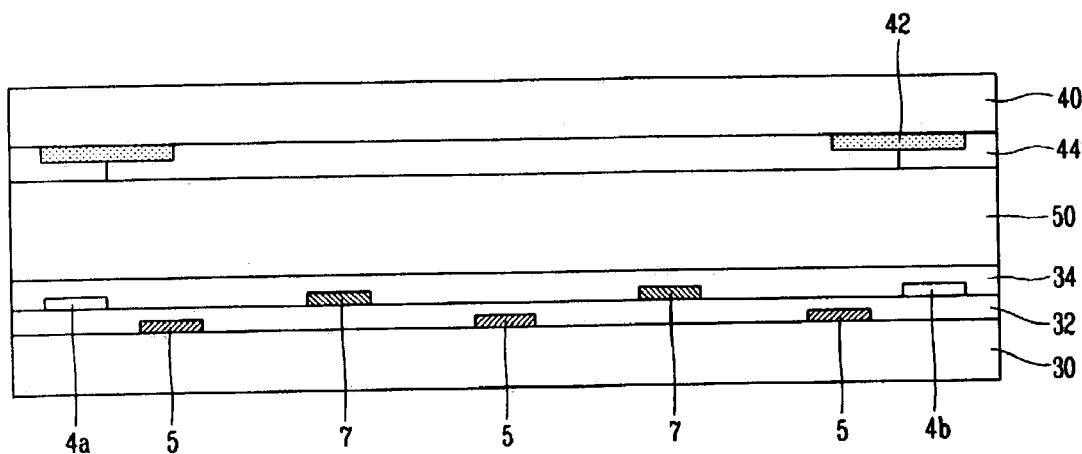
FIG. 2A is a cross sectional view along I-I' of FIG. 1 according to the related art.
Figure 2B:
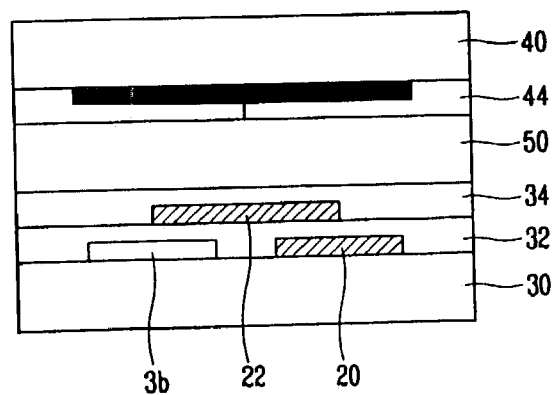
FIG. 2B is a cross sectional view along II-II' of FIG. 1 according to the related art.
Figure 3A:
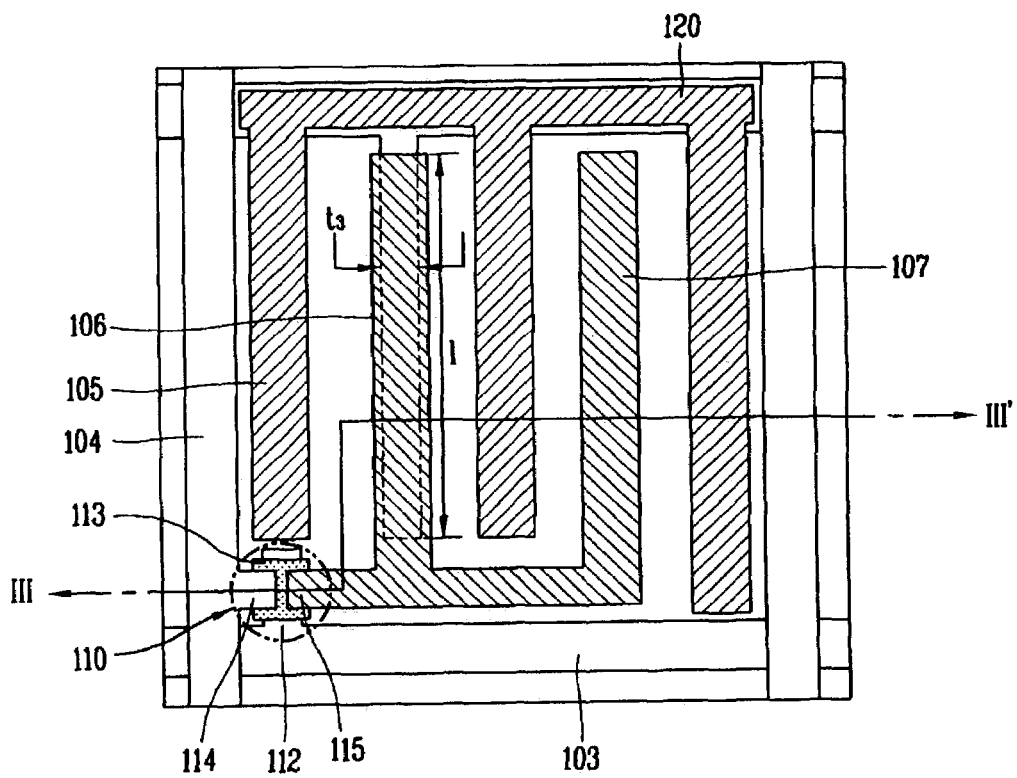
FIG. 3A is a plan view of an exemplary in-plane switching mode LCD device according to the present invention.
Figure 3B:
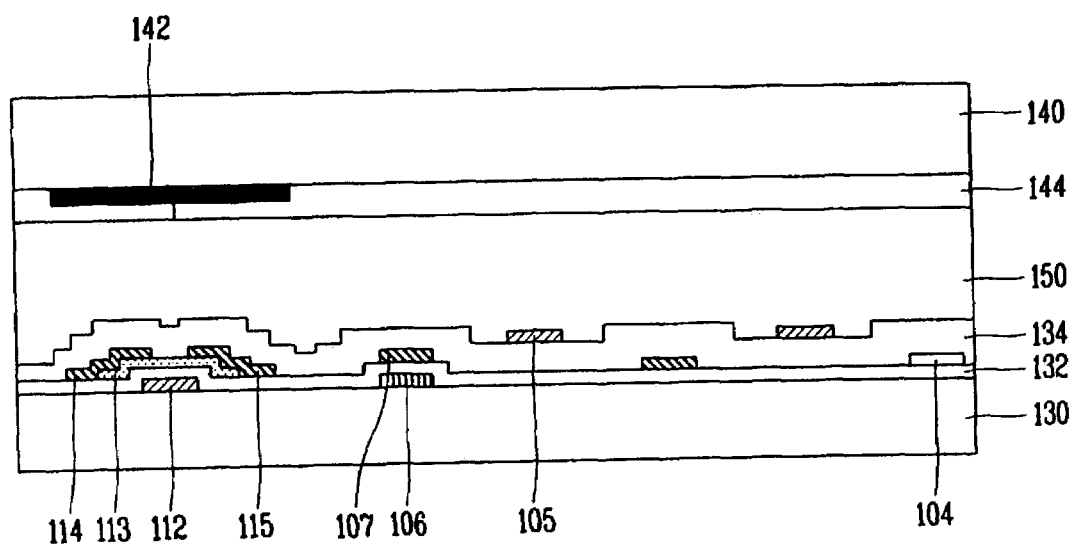
FIG. 3B is a cross sectional view along III-III' of FIG. 3A according to the present invention.

FIG. 3A is a plan view of an exemplary in-plane switching mode LCD device according to the present invention, and FIG. 3B is a cross sectional view along III-III' of FIG. 3A according to the present invention. In FIG. 3A, an exemplary in-plane switching mode LCD device may include a thin film transistor 110 formed at a region where a gate line 103 and a data line 104 cross each other. The thin film transistor 110 may include a gate electrode 112 that extends from the gate line 103, a semiconductor layer 113 formed on the gate electrode 112, and source and drain electrodes 114 and 115 that extend from the data line 104 and are disposed on the semiconductor layer 113.

In addition, a common electrode 105 and a pixel electrode 107 may be arranged in parallel to each other within a pixel region. The common electrode 105 may be connected to a common line 120 that overlaps the gate line 103, and a storage capacitor electrode 106 may be formed to overlap with the pixel electrode 107 within the pixel region. Accordingly, the storage capacitor electrode 106 and the pixel electrode may have an insulating layer disposed therebetween, thereby forming a storage capacitor.

In FIG. 3A, a width (t3) of the storage capacitor electrode 106 may be smaller than a corresponding width of the pixel electrode 107. Accordingly, if the width t3 of the storage capacitor electrode 106 is larger than the corresponding width of the pixel electrode 107, the storage capacitor electrode 106 may block any transmitted light and lower the aperture ratio.

A first storage capacitor may be formed by an overlap of the gate line 103 and the common line 120, and a second storage capacitor may be formed by an overlap of the pixel electrode 107 and the storage capacitor electrode 106. Accordingly, a sum of the capacitance of the first and second storage capacitors Cst1 and Cst2 may be a total storage capacitance (Cst) of the LCD device. The storage capacitance Cst may vary depending upon the amount of overlap between the storage capacitor electrode 106 and the pixel electrode 107. In addition, the storage capacitance (Cst) may vary depending upon the amount of overlap between the gate line 103 and the common line 120. However, since the gate line 103 may have a predetermined width and the common line 120 may have a length longer than a set length, the amount of overlap between the gate line 103 and the common line 120 may be limited. Likewise, since a width of the storage capacitor electrode 106 may be set to a width not larger than a width of the pixel electrode 107, the length of the storage capacitor electrode 106 may be adjusted. Thus, the storage capacitance (Cst) may be controlled by adjusting the width t3 and length 1 of the storage capacitor electrode 106.

In FIG. 3B, the gate electrode 112 of the thin film transistor 110 may be formed on the first substrate 130, the semiconductor 113 may be formed on the gate insulating layer 132 that may be deposited on entire surface of the first substrate 130. In addition, the source electrode 114 and the drain electrode 115 of the thin film transistor 110 may be formed on the semiconductor layer 113, and a passivation layer 134 may be deposited upon an entire surface of the first substrate 130.

The storage capacitor electrode 106 may be formed on the first substrate 130 as a single layer or as a plurality of layers by evaporating or depositing metal materials, such as Cu, Mo, Ta, Ti, Al, or an Al alloy, using a sputtering method and etching the metal material(s). In addition, the storage capacitor electrode 106 may be formed using a process different from a process for forming the gate electrode 112 on the thin film transistor 110. However, the storage capacitor electrode 106 may be formed by using similar processes (i.e., using the same photo mask) and by using similar metal material(s) in order to simplify the fabricating processes.

The pixel electrode 107 may be formed on the gate insulating layer 132, and may include a single layer or a plurality of layers made by depositing metal material(s), such as Cr, Mo, Cu, Ta, Ti, Al, or an Al alloy, using sputtering or evaporation methods and etching the metal material(s) using an etchant. In addition, the pixel electrode 107 may be formed using a process different from a process for forming the source electrode 114 and the drain electrode 15 of the thin film transistor 110. However, the pixel electrode 107 may be formed using similar processes and by using similar metal material(s) in order to simplify the fabricating processes.

The pixel electrode 107 and the storage capacitor electrode 106 may be arranged and overlap each other. Accordingly, since the gate insulating layer 132 may be located between the pixel electrode 107 and the storage capacitor electrode 106, the second storage capacitor Cst2 may be formed between the pixel electrode 107 and the storage capacitor electrode 106. Since the width t3 of the storage capacitor electrode 106 may be smaller than the corresponding width of the pixel electrode 107, the storage capacitor electrode 106 may be completely covered by the pixel electrode 107. Thus, any transmitted light may not be shielded by the storage capacitor electrode 106, wherein a sufficient amount of storage capacitance may be generated by the storage capacitor electrode 106 such that reduction of the aperture ratio may be prevented.

The common electrode 105 may be formed on the passivation layer 134, and together with the pixel electrode 107 they may form a horizontal electric field. The common electrode 105 may be formed using the material(s) used to form the gate electrode 112, such as Cu, Mo, Ta, Ti, Al, or and Al alloy, or by using the material(s) used to form the source electrode 114, such as Cr, Mo, Cu, Ta, Ti, Al, or and Al alloy. In addition, the common electrode 105 may be formed using transparent material(s), such as indium tin oxide (ITO) or indium zinc oxide (IZO), for improving aperture ratio.

A black matrix 142 may be formed on the second substrate 140 for preventing light from leaking into non-display regions, and a color filter layer 144 may be formed on the second substrate 140 to provide colored images. Although not shown, an overcoat layer may be formed on the color filter layer 144 for improving flatness of the second substrate 140. In addition, alignment layers (not shown) for orienting liquid crystal molecules may be formed on the first substrate 130 and on the second substrate 140 for providing initial orientation of liquid crystal moles of a liquid crystal material layer 150.

The liquid crystal material layer 150 may be formed between the first substrate 130 and the second substrate 140 using a vacuum liquid crystal injecting method, wherein the liquid crystal material is injected between the attached first and second substrates 130 and 140 in a vacuum chamber. Alternatively, the liquid crystal material layer 150 may be formed between the first substrate 130 and the second substrate 140 using a liquid crystal dispensing method, wherein the liquid crystal material may be directly dropped onto one or both of the first substrate 130 or the second substrate 140. Accordingly, the liquid crystal material may be uniformly dispersed between the first and second substrates 130 and 140 during processes for attaching the first and second substrates 130 and 140 together.

Figure 4:
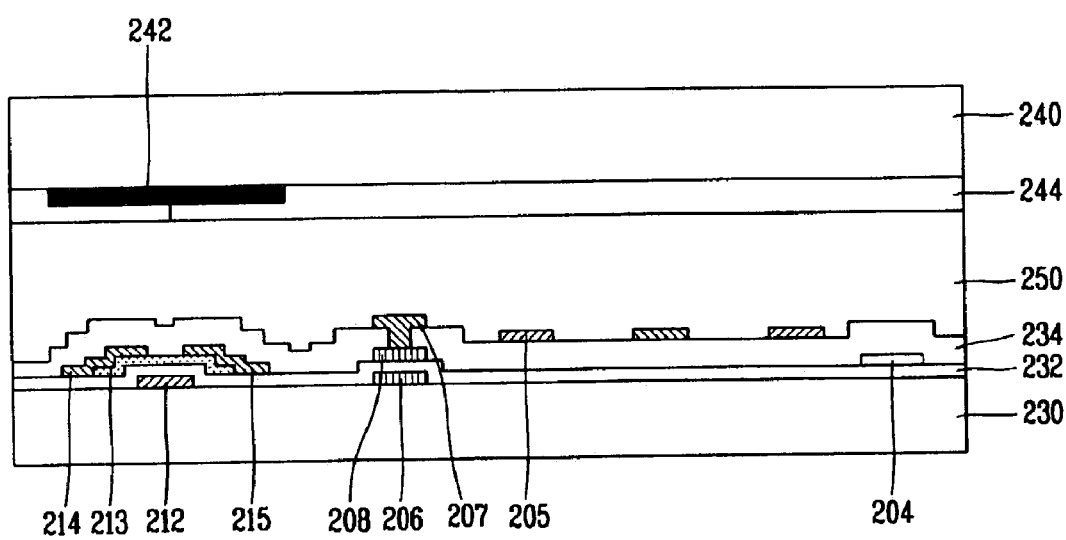
FIG. 4 is a cross sectional view of another exemplary in-plane switching mode LCD device according to the present invention.

FIG. 4 is a cross sectional view of another exemplary in-plane switching mode LCD device according to the present invention. The exemplary in-plane switching mode LCD device of FIG. 4 has a similar structure as that of FIG. 3B except for positioning of the pixel electrode. Accordingly, descriptions for similar elements in FIG. 3B have been omitted.

In FIG. 4, a first storage capacitor electrode 206 may be formed on a first substrate 230, and a second storage capacitor electrode 208 may be formed on a gate insulating layer 232. In addition, a common electrode 205 and a pixel electrode 207 may be formed in parallel to each other on a passivation layer 234. Accordingly, the common and pixel electrodes 205 and 207 may induce a horizontal electric field to a liquid crystal material layer 250.

The pixel electrode 207 may be electrically connected to the second storage capacitor electrode 208 through a contact hole formed in the passivation layer 234, and a storage capacitor may be created with the first storage capacitor electrode 206, the gate insulating layer 232, and the second storage capacitor electrode 208. The first storage capacitor electrode 206 and the second storage capacitor electrode 208 may be formed to have similar widths, or may be formed having widths less than a width of the pixel electrode 207. Accordingly, the first storage capacitor electrode 206 and the second storage capacitor electrode 208 may be completely covered by the pixel electrode 207. Thus, the aperture ratio is not reduced by the first and second storage capacitor electrodes 206 and 208.

Alternatively, the second storage capacitor electrode 208 may not be formed. Accordingly, the first storage capacitor electrode 206 may directly contact the pixel electrode 207 through the gate insulating layer 232 and the contact hole formed in the passivation layer 234. However, storage capacitance between the first storage capacitor electrode 205 and the pixel electrode 207 may be too small. Thus, the second storage capacitor electrode 208 may be incorporated as shown in FIG. 4.

Figure 5:
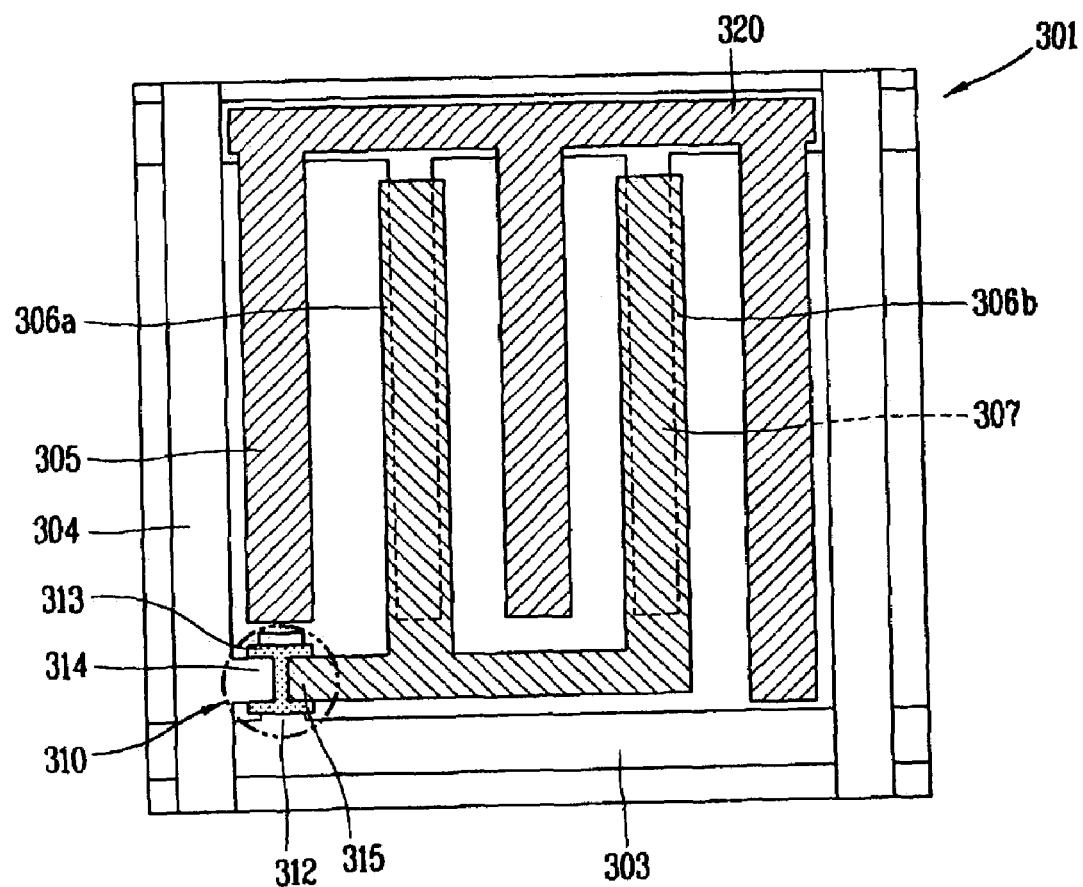
FIG. 5 is a cross sectional view of another exemplary in-plane switching mode LCD device according to the present invention.

FIG. 5 is a cross sectional view of another exemplary in-plane switching mode LCD device according to the present invention. In FIG. 5, storage capacitor electrodes 306a and 306b may be formed to overlap with two pixel electrodes 307 arranged within a pixel region. Accordingly, a total number of storage capacitor electrodes may vary depending upon a needed amount of storage capacitance. In addition, a total number of storage capacitor electrodes may vary depending upon a total number of blocks in the IPS mode LCD device.

Accordingly, in the IPS mode LCD device according to the present invention, the storage capacitor electrode may overlap with the pixel electrode to obtain a desired amount of storage capacitance and prevent reduction of the aperture ratio. However, the present invention may not be limited to the structures described above. For example, the storage capacitor electrode may be arranged to overlap the common electrode to create a storage capacitance nearly similar to the storage capacitance of the IPS mode LCD device according to the present invention. The IPS mode LCD device according to the present invention may be applied to all LCD devices, as well as 4-block, 6-block or 8-block IPS mode LCD devices.

It will be apparent to those skilled in the art that various modifications and variations can be made in the in-plane switching mode liquid crystal display device and method of fabricating an in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    a plurality of gate lines and data lines defining a plurality of pixel regions;
    a driving device disposed within each of the pixel regions;
    at least one common electrode having a first width and at least one pixel electrode having a second width both arranged within the pixel region to not overlap with each other; and
    at least one storage capacitor electrode having a third width overlapping one of the common and pixel electrodes within the pixel region to form a storage capacitor,
    wherein a portion of the common electrode overlaps and extends parallel to the gate line, and wherein the third width of the storage capacitor electrode is substantially equal to the width of the overlapped pixel electrode or common electrode.

2. The device according to claim 1, wherein the driving device includes a thin film transistor.

3. The device according to claim 2, wherein the thin film transistor comprises:
    a gate electrode on a surface of a first substrate;
    an insulating layer over the first substrate;
    a semiconductor layer on the insulating layer;
    a source electrode and a drain electrode on the semiconductor layer; and
    a passivation layer over the first substrate.

4. The device according to claim 3, wherein the storage capacitor electrode is disposed on the surface of the first substrate.

5. The device according to claim 3, wherein the common electrode is disposed on the passivation layer.

6. The device according to claim 3, wherein the pixel electrode is disposed on the insulating layer.

7. The device according to claim 3, wherein the pixel electrode is disposed on the passivation layer.

8. The device according to claim 7, further comprising another storage capacitor electrode having a fourth width on the insulating layer and connected to the pixel electrode through a contact hole formed in the passivation layer for creating a storage capacitor with the at least one storage capacitor electrode.

9. An in-plane switching mode liquid crystal device, comprising:
    a plurality of gate lines and data lines defining a plurality of pixel regions;
    a driving device disposed within each of the pixel regions;
    at least a pair of electrodes arranged within each of the pixel regions for generating a horizontal electric field, the pair of electrodes not overlapping each other; and
    at least one storage capacitor electrode having a first width overlapping one of the pair of electrodes within the pixel region for forming a storage capacitor,
    wherein a portion of one of the pair of electrodes overlaps and extends parallel to the gate line, and
    wherein the first width of the storage capacitor electrode is substantially equal to width of the overlapped one of the pair of electrodes.

10. The device according to claim 9, wherein the pair of electrodes includes a common electrode having a second width and a pixel electrode having a third width arranged substantially parallel to the common electrode.

11. The device according to claim 10, wherein the storage capacitor electrode overlaps the pixel electrode.

12. A method of fabricating an in-plane switching mode liquid crystal display device, comprising:
    forming a plurality of gate lines and data lines on a first substrate to define a plurality of pixel regions;
    forming a driving device disposed within each of the pixel regions;
    forming at least one common electrode having a first width and at least one pixel electrode having a second width within the pixel region, wherein the common and pixel electrodes do not overlap each other; and
    forming at least one storage capacitor electrode having a third width to overlap one of the common and pixel electrodes within the pixel region to form a storage capacitor, wherein a portion of the common electrode overlaps and extends parallel to the gate line, wherein the storage capacitor electrode is parallel with the data line and a third width of the storage capacitor electrode is substantially equal to the width of the overlapped pixel electrode or common electrode.

13. The method according to claim 12, wherein the driving device includes a thin film transistor having:
   a gate electrode on a surface of a first substrate;
   an insulating layer over the first substrate;
   a semiconductor layer on the insulating layer;
   a source electrode and a drain electrode on the semiconductor layer; and
   a passivation layer over the first substrate.

14. The method according to claim 13, wherein the storage capacitor electrode is disposed on the surface of the first substrate.

15. The method according to claim 13, wherein the common electrode is disposed on the passivation layer.

16. The method according to claim 13, wherein the pixel electrode is disposed on the insulating layer.

17. The method according to claim 13, wherein the pixel electrode is disposed on the passivation layer.

18. The method according to claim 17, further comprising forming another storage capacitor electrode having a fourth width on the insulating layer to be electrically connected to the pixel electrode through a contact hole formed in the passivation layer for creating a storage capacitor with the at least one storage capacitor electrode.

19. A method of fabricating an in-plane switching mode liquid crystal device, comprising:
   forming a plurality of gate lines and data lines to define a plurality of pixel regions;
   forming a driving device disposed within each of the pixel regions;
   forming at least a pair of electrodes arranged within each of the pixel regions for generating a horizontal electric field, the pair of electrodes not overlapping each other; and
   forming at least one storage capacitor electrode having a first width to overlap one of the pair of electrodes within the pixel region for forming a storage capacitor,
   wherein a portion of one of the pair of electrodes overlaps and extends parallel to the gate line, and
   wherein the storage capacitor electrode is parallel with the data line and a third width of the storage capacitor electrode is substantially equal to the width of the overlapped pixel electrode or common electrode.

20. The method according to claim 19, wherein the pair of electrodes includes a common electrode having a second width and a pixel electrode having a third width arranged substantially parallel to the common electrode.

21. The method according to claim 20, wherein the storage capacitor electrode overlaps the pixel electrode.

* * * * *